Aug. 20, 1957 E. J. BAIREUTHER 2,803,077
FILM HOLDERS
Filed May 29, 1953 2 Sheets-Sheet 1
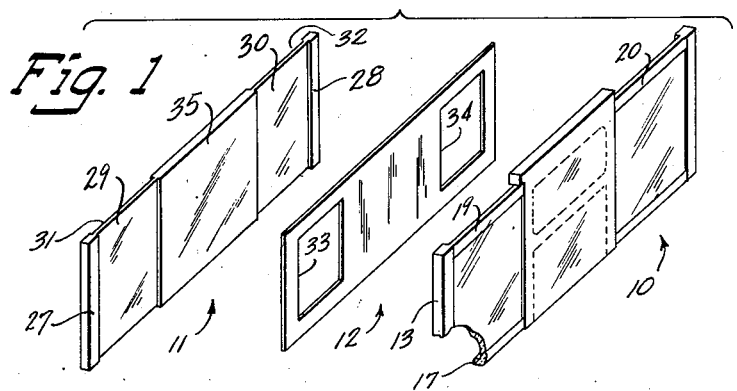
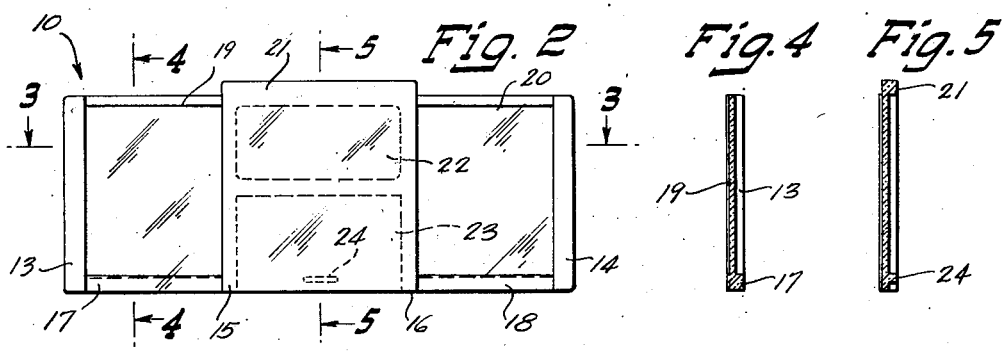
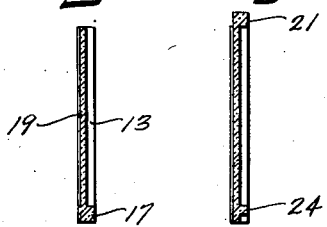
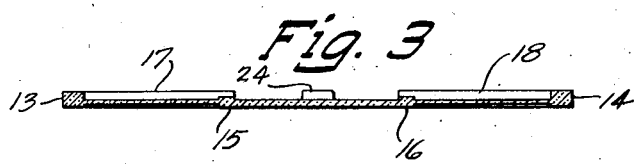
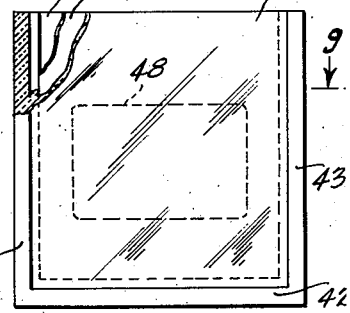
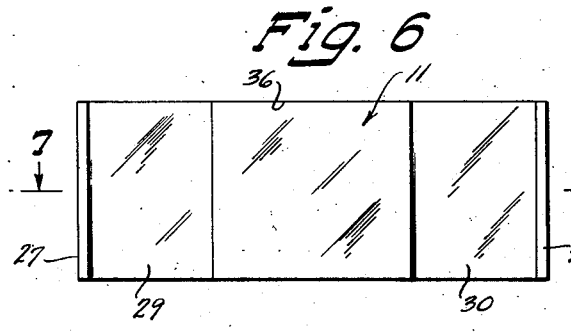
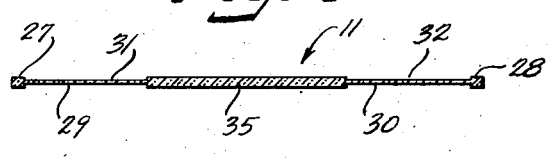
INVENTOR.
Edward J. Baireuther
BY
Elroy J. Wutschel
Attorney

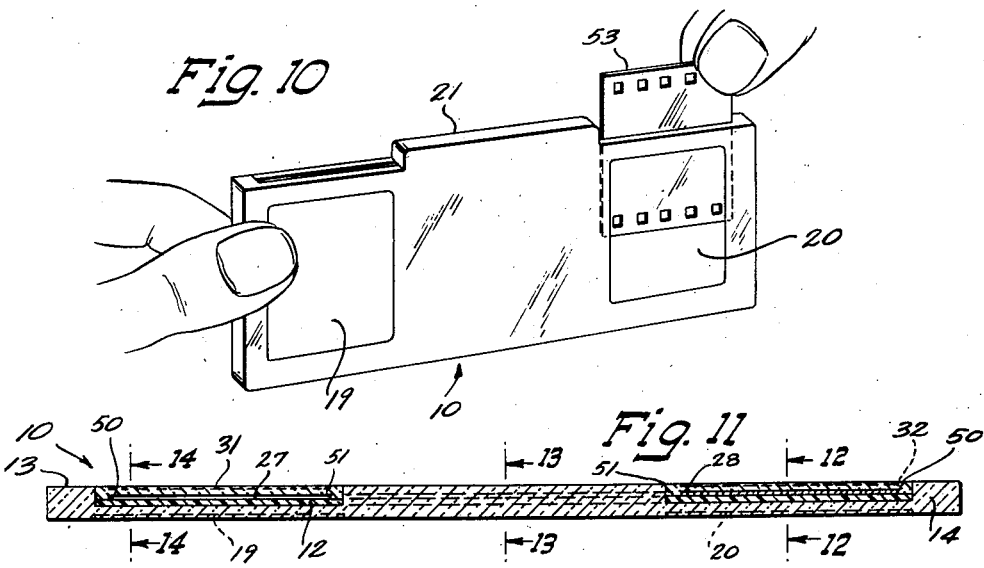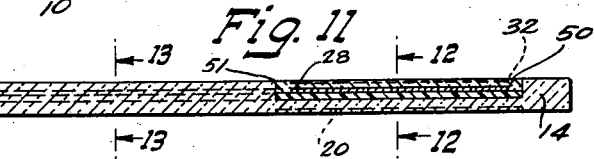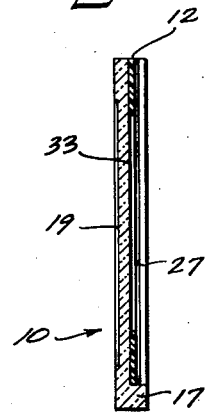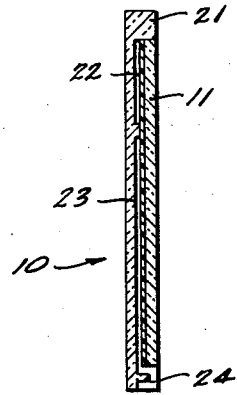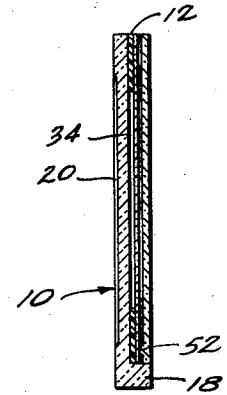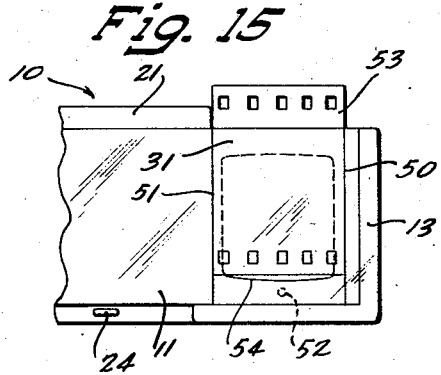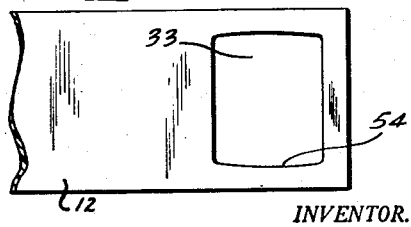

United States Patent Office 2,803,077
Patented Aug. 20, 1957

2,803,077

FILM HOLDERS

Edward J. Baireuther, Milwaukee, Wis.

Application May 29, 1953, Serial No. 358,259

2 Claims. (Cl. 40—152)

This specification constitutes a continuation-in-part of application Serial No. 144,960, filed February 18, 1950, and which was subsequently abandoned.

This invention relates generally to photographic accessories and more specifically to film holders.

A general object of the invention is to provide an improved film holder.

Another object of the invention is to provide an improved film holder having recessed areas to prevent the scratching or marring of the viewing areas.

Another object of the invention is to provide an improved film holder adapted to rigidly retain the film against movement.

Still another object is to provide an improved film holder having recessed pockets to receive the film.

Another object of the invention is to provide an improved film holder in which the film may be readily sealed and fully protected.

Another object is to provide a film holder that will allow the film to be flush on one edge to facilitate easy insertion and sealing.

Another object of the invention is to provide an improved film holder which constitutes a completely finished assembly requiring a minimum of effort to insert the film therein.

Another object is to provide an improved film holder having a title block recess into which a title paper may be readily inserted and changed.

Another object is to provide an improved film holder with an insertable title block which is fully protected against dirt and wear.

Another object is to provide an improved film holder with supporting sections which add to the stability thereof.

Another object of the invention is to provide a film holder which is readily reuseable without damage thereto.

Another object of the invention is to provide an improved film holder having ribs serving to prevent warpage.

Another object is to provide an improved film holder which may be readily assembled with a minimum of effort.

Another object of the invention is to provide an improved unbreakable film holder which may be fully sealed to preserve the film.

Still another object of the invention is to provide a film holder which may be manufactured at a minimum cost.

Yet another object of the invention is to provide a wedge means for a film holder which serves to retain the film in aligned position.

A further object of the invention is to provide an improved mat having precisely and accurately cut openings whereby incorporation in a film holder serves to aid in the insertion of film therein.

According to this invention, an improved film holder has been developed which offers many advantages over those presently available on the market. The film holder is comprised of a pair of transparent plates and an intermediate mat. The main plate is provided with supporting ribs which serve to stiffen the holder and prevent warpage. The rear plate is provided with a recessed area disposed to receive and retain a film piece. When the rear plate is fitted to the main plate with the mat disposed therebetween, the film piece is locked in position with the mat serving to frame out all portions of the film which need not be viewed. The edges of the plates adjacent the inserted film may be sealed to permanently preserve the film. An extending flange at the top of the main plate serves as a handle with which the film holder may be inserted or withdrawn from a projector or viewer. The outside faces of the main plate and rear plate adjacent to the film viewing areas are recessed. These recesses serve to prevent scratching or marring of these areas and consequently afford an unobstructed viewing area regardless of the age of the film holder. By providing a protective surface over the viewing area it is impossible for any damage to occur to the film. Recessed areas in the main frame serves to provide a title block and advertising block.

Further, the film holder is provided with an improved mat having slightly arcuate cutout portions specifically designed to aid in the edgewise insertion of the films into the narrow film recesses. As the edge of the film meets with the cut-out portion of the mat, the arcuate edge prevents full contact therebetween; rather, the film edge is contacted at two points starting at the outermost points of the recess. Thus, the film is forced outwardly and laterally into the film recess and, as downward force is applied thereto, the action will continue until the lower edge of the film is completely beyond the edge of the mat. A protruding wedge formed on rear plate serves to lock the inserted film in place in the film recess and thereby assure continued lateral and parallel positioning in the film holder.

The foregoing and other objects of this invention which will become more fully apparent from the following detailed description of an embodiment thereof may be achieved by the apparatus herein described by way of example in connection with the illustration in the accompanying drawings in which:

Figure 1 is a perspective view of the three component parts of the film holder incorporating the features of the invention;

Fig. 2 is a front elevational view of the main plate of the film holder;

Fig. 3 is a horizontal sectional view of the main plate taken substantially on the plane of line 3—3 in Fig. 2;

Fig. 4 is a vertical sectional view of the main plate taken substantially on the plane of line 4—4 in Fig. 2;

Fig. 5 is a vertical sectional view taken on the plane of line 5—5 in Fig. 2 and showing the molded construction of the main plate;

Fig. 6 is a front elevational view of the rear plate showing recessed felt protective areas;

Fig. 7 is a horizontal section of the rear plate taken substantially on line 7—7 in Fig. 6;

Fig. 8 is a front elevational view of another type of film holder incorporating the features of the invention;

Fig. 9 is a horizontal section of the modified type of film holder shown in Fig. 8;

Fig. 10 is a perspective view of a film holder being held in position for insertion of a film;

Fig. 11 is a horizontal sectional view of assembled film holder;

Fig. 12 is a vertical sectional view of the assembled film holder taken substantially on the plane of line 12—12 in Fig. 11;

Fig. 13 is a vertical sectional view taken substantially on the plane of line 13—13 in Fig. 11;

Fig. 14 is a vertical sectional view taken substantially on the plane of line 14—14 in Fig. 11;

Fig. 15 is a rear elevational view of the film holder assembly showing a film partially in place; and, Fig. 16 is a view of a portion of a mat or mask showing the arcuate cut of the horizontal edges of the cut-out portion which aids in the insertion of film.

Prior to the development of the hereinafter described film holder, films for viewers and projectors were tediously mounted between glass plates with the edges bound together with a tape. These film holders were costly to assemble with the glass serving to provide a viewing area. However, the use of glass was not desirable because of the breakage factor. Other types of film holders included the use of cut-out paper stock frames between which the film was mounted. These types of film holders were not desirable because the film was left exposed and often was damaged.

Still other types of film holder, although molded to provide a film receiving frame, were of such a complex design that the task of mounting films therein was of necessity very tedious and time consuming.

The introduction of the improved film holder herein disclosed afforded a means of eliminating all of the undesirable features of the presently used film holders. In addition, it afforded a means for positively preserving the film against deterioration and wear. As shown in Fig. 1, the film holder consists of three component parts, namely, a main frame member 10, a rear frame member 11 and an intermediate mat 12. The film holder shown was particularly designed for the mounting of spaced stereo pictures so that they may be readily viewed in a stereoscopic viewer. All three parts of the film holder are preferably molded from a plastic material with the members 10 and 11 being transparent, while the mat member 12 is opaque. The front or main member 10 and the rear member 11 must be precision molded to insure an accurate assembly of the parts.

The main member 10, as viewed in Figs. 2 and 3, includes a pair of vertical support ribs or bosses 13 and 14 at the outer edges of the member. These two ribs together with a pair of secondary ribs 15 and 16 serve to prevent warpage of the film holder assembly due primarily to temperature changes. A pair of rib or boss segments 17 and 18 horizontally disposed at the bottom of the main plate 10 join with the ribs 13 and 14, respectively. A pair of recessed window areas 19 and 20 are molded on the outer face of the frame 10.

An intermedially disposed horizontal rib 21 at the top of the main plate 10 serves in a dual capacity to support the mid-section of the rear plate 11 and to provide a grasp whereby the film holder may be readily inserted and withdrawn from a projector or viewer. The inner-face of the main frame 10 is recessed to provide an advertising insert block 22 and a title insert block 23. A small knobular extension 24 serves to retain a title insert panel in place.

The inclusion of the advertising block 22 in the mid-section of the main frame 10 affords a means for identifying the product. Since the panel 22 is fully enclosed, the advertising medium can never be destroyed or damaged in any manner. Likewise, the inclusion of a title block 23 at the bottom of the main frame 10 affords a means for readily inserting a title into each film holder with comparative ease. The title insert may be readily removed from the film holder at any time and changed as the occasion might dictate. The title panel would preferably be made of a heavy paper and is fully protected against wear or damage occasioned during the continued use of the film holder.

As shown in Figs. 6 and 7, the rear frame member 11 consists of a plastic panel having precisely molded side ribs 27 and 28. The side ribs are designed to be fitted within the vertical ribs 13 and 14 on the main plate 10. The application of heat to the side rib members of the main plate 10 and the rear frame 11 serve to weld the two together into a unitary film holder. A pair of recessed areas 29 and 30 on the inner face of the rear frame 11 serve to provide film pockets wherein the film can be contained. The recessed areas 29 and 30 are aligned with the recessed window areas 19 and 20 on the main frame 10. In addition, they are aligned with a pair of recessed window areas 31 and 32 on the back face of the rear frame 11. The outer recessed window areas 19, 20, 31 and 32 permit the film holder to be laid down without fear of scratching the surfaces through which the film is viewed.

In the film holders heretofore used, the films are generally entirely exposed to atmosphere and, consequently, are often damaged during the normal use thereof in a projector or viewer. My improved film holder provides a protective surface over each side of the film and, consequently, the films contained in the film holder are indestructible. The films are fully contained within the holder at all times with the top edge of the film pockets 19 and 20 being sealed against the atmosphere and dust by the application of a fluid acetate in a well known manner. The top edge of the film is level with the top edges of both frame members 10 and 11 so that the application of a sealer actually serves to retain the films in position. By sealing the films in the holder it is impossible for them to cant out of position such as might occur when the film holder is dropped or jarred. The film subject to be viewed in the holder is always in alignment within the frame or window openings 33 and 34 provided in the mat 12. A thickened mid-section 35 in the rear frame 11 serves to stiffen the mid-section of the main frame 10. A top edge 36 on the mid-section 35 is precision molded to fit against the horizontal rib 21 on the main frame 10. During the assembly of the film holder, heat is likewise applied to the joining top edges of the members 10 and 11 to weld the two units together.

A novel means has been devised for retaining the film in the film holder. Heretofore, most film holders did not include any means for securely holding the film in position. Thus, even though the film was in proper alignment when originally mounted in the holder, it often became displaced or misaligned when the film holder was handled during insertion into a viewer or projector. This condition cannot be tolerated in a stereo film holder since it is imperative that both films must be in absolute alignment with each other at all times in order to insure good viewing of the subject matter on the film. In order to provide an absolutely straight guide and retainer for each of the stereo films, the recessed film areas 29 and 30 in the rear frame 11 are defined by guiding edges 50 and 51, as shown in Figs. 11 and 16. Since each film is cut to a width corresponding to the width between the edges 50 and 51, the films are precisely guided by said edges during insertion into the film holder. The recessed film areas 29 and 30 are precisely molded into the rear frame 11 in order to insure precise spacing of the two films therein for stereoscopic viewing purposes. When the film holder is assembled, the film recess area is positively defined by such side edges 50 and 51 and by the bottom ribs 18 or 19. In addition, a wedge or knob 52 molded on the inner bottom face of each of the film recesses 29 and 30 (see Figs. 12 and 15) serves to grip the films when they are fully inserted into the film receiving cavities. By actual test, it was found that the wedge serves to grip the film and prevent any edgewise movement either upwardly or downwardly within the film cavity. In fact, these wedges serve to insure absolute continued alignment between the two stereo films mounted in the film holder.

A novel and improved mat or mask 12, as detailedly shown in Fig. 16, has been provided in order to eliminate one of the most inherent characteristics of a pre-assembled film holder, namely, the tendency of the films being inserted therein to hook or catch on the cut-out portion of the mask. Customarily, the cut-outs 33 and 34 in the mat or mask 12 are rectangular in shape with sharply defined corners and edges, such as are suggested in Fig. 1. When the straight bottom edge of a film 53 meets with the lower edge of the cut-out portion of the mask, the two edges will butt throughout their entire length and often absolutely prevent further insertion of the film into the film cavity of the holder. Because of this characteristic, many amateur and professional photographers chose to assemble their own film mounts and carefully insert the film during assembly; thus they were sure that the film was properly mounted without damage.

The applicant discovered that by cutting a lower edge 54 of the cut-out 33 on an arcuate line, such as is shown in Figs. 10, 15 and 16, the lower edge of the film 53 will strike the arcuate edge of the mask cut-out at only two points, namely, the uppermost points. As continued pressure is applied to the film 53, as shown in Fig. 10, the film will bow backwardly into the film recess area provided as it moves downwardly. However, since the edges of the film and cut-out cannot butt, it is not possible to jam the film in the holder in a manner to cause damage to either the film or the holder. Because of this trait of the arcuate mask cut-out, all pre-assembled film holders are useable and the films may be inserted therein with a minimum of time and effort. No damage can be inflicted to the film during insertion.

It is readily apparent from the study of the aforedescribed film holder that an improved unit has been invented. Not only is the film holder precisely molded so that each one will fit into a projector or viewer with an identical degree of ease, but each of the film holders afford a means to view stereoscopical films with a degree of clarity and reality heretofore unknown. The plastic surfaces of each face of the film serve to protect the film from the effects of normal handling during the insertion and removal from a projector or viewer. At the same time, the recessed areas adjoining the film faces serve to prevent any scratching or marring of the material through which the film is to be viewed. If this area was flush with the outer face of the film holder such as is the case in the presently used glass film holders, the viewing surfaces soon become worn and scratched. Ultimately, the film holder would become useless and the film would have to be removed therefrom and mounted in another holder. Such a condition cannot exist when a film holder designed in the manner disclosed herein is utilized.

Likewise, it should be apparent to those skilled in the art, that this film holder can be readily assembled with a minimum of effort. The three component parts 10, 11 and 12 need only be pressed together and heat applied to the edges to weld them together into an integral film holder. In fact, the assembly thereof could be effected automatically with a specially designed machine. The cost of the parts of the film holder is very low since they are readily adaptable to high speed production. The insertion of the film may be effected by comparatively unskilled help in a matter of seconds. Thereafter, the films are completely sealed by the application of the liquid acetate to the top edges of the plastic material. If at a later date it is necessary to remove the film from the holder, the film pockets 19 and 20 may be readily opened by the application of a sharp instrument to the top edge of the film holder. Thus, the film holder can be reused any number of times without damage thereto.

The application of the invention to a single panel type of film holder is shown in Figs. 8 and 9. This type of film holder is generally known in the trade as a 2 x 2 holder. The application of the principles of my invention to such a film holder is readily shown in Figs. 8 and 9. A main frame 40 is provided with supporting ribs 41, 42 and 43 on three sides with the fourth side remaining open to provide a film insertion slot 44. The front face of the main frame is recessed to provide a protected viewing area 45 in front of the film. A rear frame 46 is likewise provided with supporting ribs on three sides. These ribs are precisely molded to fit within the enclosure formed by the supporting ribs 41, 42 and 43 in the main frame 40. The application of heat to the rib surfaces will serve to weld the two members together into a single film holder unit. A framing mat 47 intermediately disposed between the members 40 and 46 serves to frame out the side edges of the film which need not be projected or viewed. Thus, a viewing frame 48 is provided through which the film can be viewed. The rear frame 46 is likewise recessed to provide a protective area 49 directly behind the film surface. This area likewise cannot be damaged when the film holder is laid upon a rough surface.

From the foregoing detailed description of several practical working embodiments of the invention, it is apparent that an improved film holder has been provided which may be inexpensively manufactured and assembled. The film holder serves to fully protect the film against damage usually imparted through contact with the human skin. In addition, the film is protected against dust and wear. The film holder itself is practically indestructible and should the occasion arise, it can be readily reused for other film without any damage thereto.

Although but two embodiments of the invention have been set forth in considerable detail to constitute a disclosure of the invention, it is to be understood that persons skilled in the art may utilize the novel principles taught herein which differs in construction from the particular film holder described herein without departing from the spirit and scope of the invention, as defined in the subjoined claims.

The principles of the invention having now been fully explained in connection with the foregoing description of embodying structure, I hereby claim as my invention:

1. A stereoscopic film holder comprising two plastic members molded in a manner to provide a permanent interlock therebetween, and consisting of a main member having marginal bosses at opposite side edges and partial marginal bosses intermittently disposed along opposite longitudinal edges in a manner to receive a secondary frame member molded to precisely fit within the marginal bosses of said main frame member, a mask member disposed to fit between said frame members and provided with a pair of cutout portions to define film viewing areas, said secondary frame member having a pair of depressed areas on the inner face thereof corresponding with the film viewing areas of said mask member to provide a film receiving pocket therebetween, said frame members each having a pair of depressed areas on each of the exposed faces thereof corresponding with the film viewing areas of said mask and designed to provide a scratch-free protective area adjacent to the film viewing areas, said main frame member having an intermediate depressed area disposed to provide a pocket to receive a title block, a title block retaining nodule formed on said main frame whereby said title block may be inserted and retained while serving to identify the subject matter of the films contained in the film holder.

2. As a new article of manufacture, a stereo film mount comprising a main frame having a plurality of projecting ribs intermittently disposed about the perimeter of the inner face thereof, a pair of spaced-apart recessed window cavities on the opposite outer face thereof, and a title block recess intermediately disposed of said window cavities but on the inner face thereof; a mask positionably retained by said ribs in a manner to locate two cut-out openings coincidentally with said window cavities in said main frame; and a secondary frame sized to fit within the projecting ribs of said main frame and having a pair of film retaining cavities on the inner face of said secondary frame disposed in alignment with said spaced main frame window cavities and said cut-out mask openings, a pair of spaced-apart recessed window cavities on the opposite outer face of said secondary frame, whereby the assemblage of said main frame, mask and secondary frame provides a film mount especially designed for the reception of a stereo pair of films into said film retaining cavities for complete enclosure therein and for viewing via a continuous light imparting and aligned pair of spaced transparent windows, and the reception of an identifying title block into said title block recess.

References Cited in the file of this patent

UNITED STATES PATENTS

| | | |
|---|---|---|
| 1,568,674 | Knowles | Jan. 5, 1926 |
| 2,127,940 | Rinn | Aug. 23, 1938 |
| 2,292,312 | Wittel | Aug. 4, 1942 |
| 2,390,053 | Bradford | Dec. 4, 1945 |
| 2,505,250 | Kime | Apr. 25, 1950 |
| 2,512,106 | Langan | June 20, 1950 |
| 2,527,765 | Roehrl | Oct. 31, 1950 |
| 2,532,776 | Linser | Dec. 5, 1950 |
| 2,690,022 | Sacre | Sept. 28, 1954 |

FOREIGN PATENTS

| | | |
|---|---|---|
| 707,500 | Germany | June 24, 1941 |